July 7, 1970                G. BARTEL                3,519,015
DEVICE FOR THE MANUFACTURE OF SYNTHETIC MIXTURES FROM
COMPONENTS OF DIFFERENT VISCOSITIES
Filed July 7, 1967
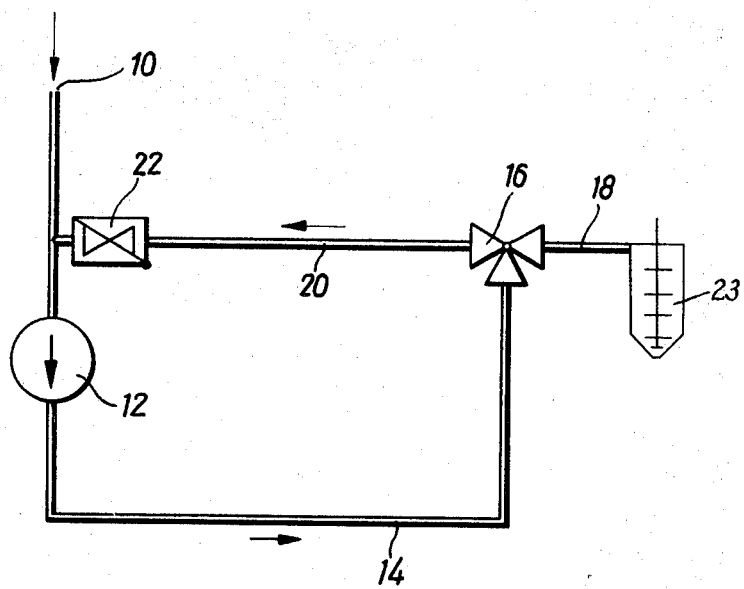
Inventor:
Günter Bartel
By
Watson Cole Grindle & Watson
Attys.

3,519,015
DEVICE FOR THE MANUFACTURE OF SYNTHETIC MIXTURES FROM COMPONENTS OF DIFFERENT VISCOSITIES
Günter Bartel, Lotte, Kreis Tecklenburg, Germany, assignor to Firma Elastomer A.G., Chur, Switzerland
Filed July 7, 1967, Ser. No. 651,788
Claims priority, application Germany, July 12, 1966,
E 32,051
Int. Cl. F04c *15/00*
U.S. Cl. 137—563  2 Claims

ABSTRACT OF THE DISCLOSURE

An apparatus adapted to deliver a liquid to a mixer at a substantially constant pressure wherein a three-way valve is provided in a conduit on the discharge side of the pump to divert liquid, when not being pumped into the mixer, back through a check valve to a conduit on the suction side of the pump.

---

The invention relates to a device for the manufacture of mixtures of synthetic materials, using components of different viscosities, the individual components being fed at predetermined pressures, in predetermined quantities and/or at predetermined speeds to a mixing container, mixer head or mixer nozzle.

The present invention is aimed at ensuring that despite the different viscosities of the individual components and despite possible radical variations in pressure, quantity and/or speed conditions where the supply of the components is concerned, the synthetic mixture produced contains the prescribed proportions of the different components with high accuracy. This problem arises especially in cases where one or more low-viscosity components are injected in surge fashion into a high-viscosity component.

It has been proposed to solve this problem by controlling the operation of the pump supplying the components. However, in this case a time lag arising from the switching on and switching off of the pump cannot be avoided, especially where a low-viscosity component is concerned. Further, attempts have been made to control the supply of the low-viscosity component via a relay circuit by means of a manometer located in the line carrying the high-viscosity component. However, this complicated system has equally failed to gain acceptance.

The device in accordance with the invention provides a simple solution to the problem so that the end-product obtained at all times has a uniform composition. The device has been found especially advantageous in situations where a low-viscosity component is being injected into a high-viscosity component in a rapid series of surges.

The invention provides a device for producing mixtures of synthetic material, in which at least one line carrying one of the components to the mixing arrangement, there is included a mass store for that component, which store is maintained at the required feed pressure.

In this manner, the complete line system up to the mixing arrangement is maintained at a back pressure so that in the supply, especially with injection, the desired pressure is immediately available at the feed control element.

Generally, it is sufficient to provide the device in accordance with the invention only in the supply system carrying the lower-viscosity component or components, and for these components individual pumping systems for injection purposes may be provided.

In a preferred embodiment of the device in accordance with the invention, each pump assembly is connected at its delivery side to a 3-way control element which, in one position, opens the path of the mix component to the mixing or injection element and in the other position opens a path to the suction side of the pump system through a return line in which, in order to maintain the back pressure, a check valve is included. The check valve is advantageously spring-loaded, and preferably adjustable, so that the device can be adapted in a simple manner to allow for different recipes, mass flows and other mixing conditions.

The accompanying drawing schematically illustrates one example of the device in accordance with the invention. The supply of the component to a pump assembly 12 is effected at 10, generally under the influence of the static pressure of the mass of synthetic material. This pump assembly feeds the component through a line 14 to a 3-way control element 16. During mixing or injection, the 3-way control element 16 opens the path to the mixer head 23 through a line 18, the component otherwise being returned through a line 20 to the suction side of the pump assembly 12. In the line 20, a check valve 22 is provided which, when the preset pressure is reached, opens the path or part of the full flow section, back to the pump. The lines 14 and 20 thus act as mass stores, or accumulators, in which the component is continuously present at the requisite injection pressure.

What I claim is:

1. An apparatus for mixing liquids comprising a mixer in combination with a first means for delivering liquid to said mixer and a second means for delivering liquid to said mixer, at least one of said means including means for accumulating a volume of liquid at a constant predetermined pressure for supply to said mixer, said accumulating means comprising a pump, a first conduit leading from a source of liquid to the suction side of said pump, a second conduit leading from the discharge side of said pump to a three-way valve, a third conduit leading from said valve to said mixer, a fourth conduit leading from said valve to said first conduit and a pressure responsive check valve in said fourth conduit near the suction side of said pump and spaced from said three-way valve a sufficient distance to provide means for accumulating a substantial volume of liquid under pressure between said three-way valve and the suction side of the pump determined by said check valve.

2. The apparatus of claim 1 wherein said check valve is adapted to open and close at a predetermined pressure setting whereby liquid in said second and fourth conduits is maintained under a back pressure.

References Cited

UNITED STATES PATENTS

| | | | |
|---|---|---|---|
| 2,244,212 | 6/1941 | Patton | 137—108 X |
| 2,861,364 | 11/1958 | Klein | 137—563 X |
| 3,140,049 | 7/1964 | Norstrud et al. | 137—563 X |
| 3,421,548 | 1/1969 | Hare | 137—563 |
| 2,564,306 | 8/1951 | Isreeli et al. | 137—567 X |
| 2,810,606 | 10/1957 | Taylor | 137—569 X |
| 2,965,119 | 12/1960 | Hawkinson et al. | 137—563 X |
| 3,119,322 | 1/1964 | Valente | 137—569 X |

M. CARY NELSON, Primary Examiner

W. R. CLINE, Assistant Examiner